US008642714B2

(12) United States Patent
Sue et al.

(10) Patent No.: US 8,642,714 B2
(45) Date of Patent: Feb. 4, 2014

(54) PHENOL RESIN AND RESIN COMPOSITION

(75) Inventors: Haruaki Sue, Chikusei (JP); Kuniaki Satou, Yuki (JP); Osamu Matsuzaka, Hitachi (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 648 days.

(21) Appl. No.: 12/162,277

(22) PCT Filed: Jan. 24, 2007

(86) PCT No.: PCT/JP2007/051071
§ 371 (c)(1),
(2), (4) Date: Jul. 25, 2008

(87) PCT Pub. No.: WO2007/086415
PCT Pub. Date: Aug. 2, 2007

(65) Prior Publication Data
US 2009/0171061 A1 Jul. 2, 2009

(30) Foreign Application Priority Data
Jan. 25, 2006 (JP) ................ P2006-016212

(51) Int. Cl.
*C08G 8/04* (2006.01)
(52) U.S. Cl.
USPC ............ 528/153; 528/129; 528/155
(58) Field of Classification Search
USPC ....................... 528/129, 153, 155
See application file for complete search history.

(56) References Cited

U.S. PATENT DOCUMENTS 2,385,372 A * 9/1945 Hamilton ............ 528/155
4,206,262 A * 6/1980 Craig ................ 428/404

(Continued)

FOREIGN PATENT DOCUMENTS

| EP | 0 915 118 A1 | 5/1999 |
|---|---|---|
| JP | P3428699 B2 | 4/1995 |

(Continued)

OTHER PUBLICATIONS

International Search Report Issued in the Corresponding Japanese Application No. PCT/JP2007/051071, Completed on Feb. 15, 2007 and Mailed on Feb. 27, 2007.

(Continued)

*Primary Examiner* — Michael L Leonard
(74) *Attorney, Agent, or Firm* — Griffin & Szipl, P.C.

(57) ABSTRACT

The present invention provides a phenol resin having, as a unit in its main-chain skeleton, a structure represented by the following general formula (I), as well as a resin composition using the same. According to the phenol resin of the invention, epoxylation thereof, chemical modification thereof, reaction thereof with an epoxy resin, and the like are facilitated. Phenol resins ranging from low-molecular-weight resins rich in fluidity to high-melting resins can be synthesized, and these phenol resins are industrially useful. When the phenol resin of the present invention is used as a hardening agent for epoxy resin etc., its resin composition can give a cured product of high Tg without deteriorating adhesiveness.

(Formula 1)

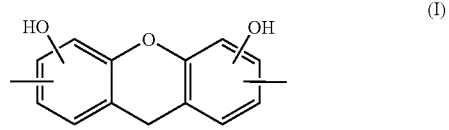

20 Claims, 6 Drawing Sheets

(56) References Cited

U.S. PATENT DOCUMENTS

| | | | |
|---|---|---|---|
| 4,333,513 A | | 6/1982 | Craig |
| 5,459,223 A | * | 10/1995 | Sue et al. .................. 528/153 |
| 6,194,491 B1 | * | 2/2001 | Fujii et al. .................. 523/466 |
| 6,207,789 B1 | | 3/2001 | Sue et al. |
| 2003/0092852 A1 | | 5/2003 | Ogura et al. |

FOREIGN PATENT DOCUMENTS

| | | | | |
|---|---|---|---|---|
| JP | 10-147628 A | | 6/1998 | |
| JP | 10147628 A | * | 6/1998 | ............. C08G 59/24 |
| JP | 11021426 A | * | 1/1999 | ............. C08L 63/00 |
| JP | 2001-055425 A | | 2/2001 | |
| JP | 2003-137950 A | | 5/2003 | |
| JP | 2005-281675 A | | 10/2005 | |
| JP | 2005-307185 A | | 11/2005 | |
| TW | 452944 B | | 9/2001 | |
| WO | 98/55523 A1 | | 12/1998 | |

OTHER PUBLICATIONS

Office Action issued in corresponding Korean Application No. 9-5-2009-052217495, mailed Dec. 18, 2009 with an English translation.

Office Action issued in corresponding Taiwanese Application No. 96102883 and its english translation of Taiwanese Office Action dated Oct. 27, 2010.

Second Office Action issued in Chinese Application No. 200780002946.X, dated Aug. 4, 2010 and its English translation.

Patent Abstracts of Japan corresponding to JP 11-021426, downloaded Apr. 12, 2013 (which corresponds to Exhibit C).

Xylene Resin Nikanol®, at http://www.fudow.co.jp/en/products/nikanol.html (2009)(downloaded Apr. 17, 2013).

Office Action issued in corresponding Korean Application No. 10-2008-7018095 mailed Jun. 4, 2010.

English translation of Office Action issued in Korean Application No. 10-2008-7018095, mailed Jun. 4, 2010.

Patent Abstract of Japanese Patent No. 10-147628, filed as Exhibit A, Feb. 6, 1998.

Hawley's Condensed Chemical Dictionary, 1987, pp. 103, 175, 840 and 1005, filed as Exhibit B.

Extended European Search Report issued in corresponding application 07707318.7, completed Oct. 9, 2013 and mailed Oct. 16, 2013.

* cited by examiner

ELUTION TIME (MINUTE)

REACTION TIME (h)

ELUTION TIME (MINUTE)

ELUTION TIME (MINUTE)

ELUTION TIME (MINUTE)

ELUTION TIME (MINUTE)

PHENOL RESIN AND RESIN COMPOSITION

This is a National Phase Application in the United States of International Patent Application No. PCT/JP2007/051071 filed Jan. 24, 2007, which claims priority on Japanese Patent Application No. 2006-016212, filed Jan. 25, 2006. The entire disclosures of the above patent applications are hereby incorporated by reference.

TECHNICAL FIELD

The present invention relates to a phenol resin and a resin composition.

BACKGROUND ART

The phenol resin is used widely in adhesives, coatings etc. because of its excellent adhesiveness. The phenol resin is compounded with various fillers and widely used in forming materials because of its heat resistance and chemical resistance. Conventionally, the phenol resin is used widely as the state-of-the-art electronics materials for electrical and electronic instruments, such as an electronic material, a semiconductor material, and a constituent material for semiconductor packages and color liquid crystals.

The phenol resin used in these materials is classically a novolac resin of phenol and formaldehyde using an acid catalyst or a resol resin using a basic catalyst, and these resins have been used for a long time. Both novolac- and resol-type alkyl phenol resins using an alkyl phenol as the starting material have also been used widely as rubber/tires for a long time.

In recent years, special phenol resins have also been developed for use in cutting-edge electronics. For example, there are phenol resins having phenol and phenol bound not via a methylene chain but via a para-alkylene chain or those having phenol and phenol bound via dicyclopentadiene etc., and these resins would also fall under the category of phenol resin in broad meaning. These resins have a molecular structure having the density of hydroxyl groups reduced by introducing a hydrophobic structure into a phenol resin, thereby aiming at improvement in hygroscopic characteristics. The former group is endowed with fluidity due to a para-alkylene structure and the latter group is endowed with, for example, an increase in Tg due to a rigid structure of dicyclopentadiene, and both the groups are used preferably as epoxy resin hardening agents for semiconductor sealing.

As phenol resins having a special structure in their main chain, those having a dibenzoxanthene structure and those having a fluorane structure have been developed. Both the dibenzoxanthene structure and fluorane structure are highly hydrophobic, rigid structures, and therefore, when these structures are used as hardening agents for epoxy resin, etc., excellent resin compositions with low hygroscopicity and high Tg can be obtained. Thus, phenol resins having a benzoxanthene derivative in their main chain have been developed. When the proportion of the dibenzoxanthene derivative is increased, the benzoxanthene derivative itself does not have a phenolic hydroxyl group and does thus not react with an epoxy group etc. and is hardly epoxylated by reaction with epichlorohydrin etc.

Up to now, catechol or resorcinol is reacted with formaldehyde etc. in the presence of an acid catalyst, to give a novolac resin (see, for example, Japanese Patent No. 3428699). According to such literatures, the hydroxyl equivalent of the resin obtained by using catechol etc. is around 60 g/eq. (hydroxyl equivalent), thus indicating that the resin does not contain a dibenzoxanthene derivative having a phenolic hydroxyl group. For this reason, it can be seen that under the generally known novolac production conditions, a dibenzoxanthene derivative structure is not formed and a dibenzoxanthene derivative having a phenolic hydroxyl group is not formed. If a dibenzoxanthene derivative structure were actually present in the resin, the novolac resin having a theoretical hydroxyl equivalent of around 60 would have a hydroxyl equivalent of 80 to 130 or so depending on the content of the dibenzoxanthene derivative.

On the other hand, a compound having a phenolic hydroxyl group in a dibenzoxanthene derivative structure has also been proposed. Although the proposed compound is not limited to the one having a dibenzoxanthene structure, such molecular structure attracts attention, probably owing to its effectiveness. A phenolic hydroxyl group is evidently possessed by the compound, but is not introduced into the main-chain skeleton of a phenol resin (see, for example, JP-A 2005-307185).

DISCLOSURE OF THE INVENTION

The present inventors focused their attention on a dibenzoxanthene derivative structure and previously found a process for producing a phenol resin having a dibenzoxanthene derivative in the main-chain structure thereof. This process was a process for producing a phenol resin having a dibenzoxanthene structure in the main-chain structure thereof in one stage, wherein a naphthol and an aldehyde are reacted with each other in the presence of an acid catalyst under simple but special reaction conditions by which hydroxyl groups in adjacent naphthol molecules bound via 2,2'-methylene undergo intramolecular dehydration ring closure, thereby producing the intended phenol resin.

However, the benzoxanthene derivative formed by using this synthesis process cannot form a hydroxyl group useful for chemical modification and for reaction with an epoxy resin. On the other hand, if the phenol resin is allowed to have a xanthene structure as a constituent element and also have useful functional groups in its main chain, various isomer structures thereof will also be contained in the product. Accordingly, phenol resins ranging from those showing fluidity at ordinary temperature to those having a softening point of 130° C. or more can be synthesized by suitably selecting the average-molecular weight. By thus selecting the molecular weight, the softening and fluidity can be designed.

The present inventors have focused their attention on development of a novel phenol resin having, in its main-chain structure, a xanthene derivative into which a useful functional group such as a phenolic hydroxyl group was introduced by using dihydroxybenzene, for example, catechol or resorcinol in place of naphthol as a starting material of dibenzoxanthene.

As described above, the object of the present invention is to provide a novel phenol resin having, in its main-chain structure, a derivative into which a useful functional group such as a phenolic hydroxyl group was introduced, as well as a resin composition using the same.

The present invention relates to the following (1) to (6):

(1) A phenol resin having, as a unit in its main-chain skeleton, a structure represented by the following general formula (I):

[Formula 1]

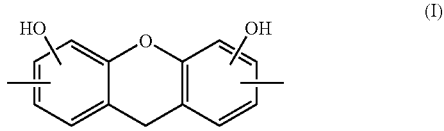

(2) A phenol resin having, as a unit in its main-chain skeleton, a structure represented by the following general formula (II):

[Formula 2]

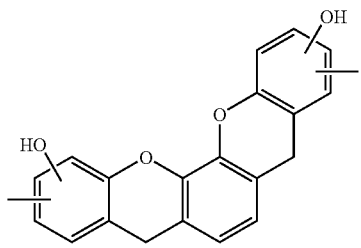

(3) A phenol resin having, as a unit in its main-chain skeleton, a structure represented by the following general formula (III):

[Formula 3]

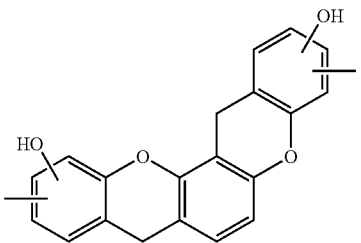

(4) A phenol resin having, as a unit in its main-chain skeleton, a structure represented by the following general formula (IV):

[Formula 4]

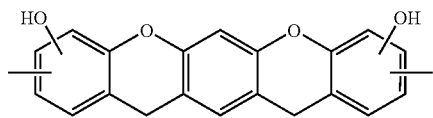

(5) A phenol resin obtained by the reaction between a dihydroxybenzene and an aldehyde and having an average hydroxyl equivalent of 65 to 130.
(6) A resin composition comprising the phenol resin of any one of the above-mentioned (1) to (5).

According to the phenol resin of the invention having a phenolic hydroxyl group in a main-chain structure of the phenol resin, epoxylation thereof by reaction with epichlorohydrin etc., chemical modification thereof, reaction thereof with an epoxy resin, and the like are facilitated. Phenol resins ranging from low-molecular-weight resins extremely rich in fluidity to high-melting resins can be synthesized, and these phenol resins are industrially useful.

When the phenol resin of the present invention is used as a hardening agent for epoxy resin etc., its resin composition can give a cured product of high Tg without deteriorating adhesiveness.

The disclosure of this application is related to a main subject described in Japanese Patent Application No. 2006-016212 filed on Jan. 25, 2006, the disclosure of which is incorporated herein by reference.

BEST MODE FOR CARRYING OUT THE INVENTION

Figure 1:
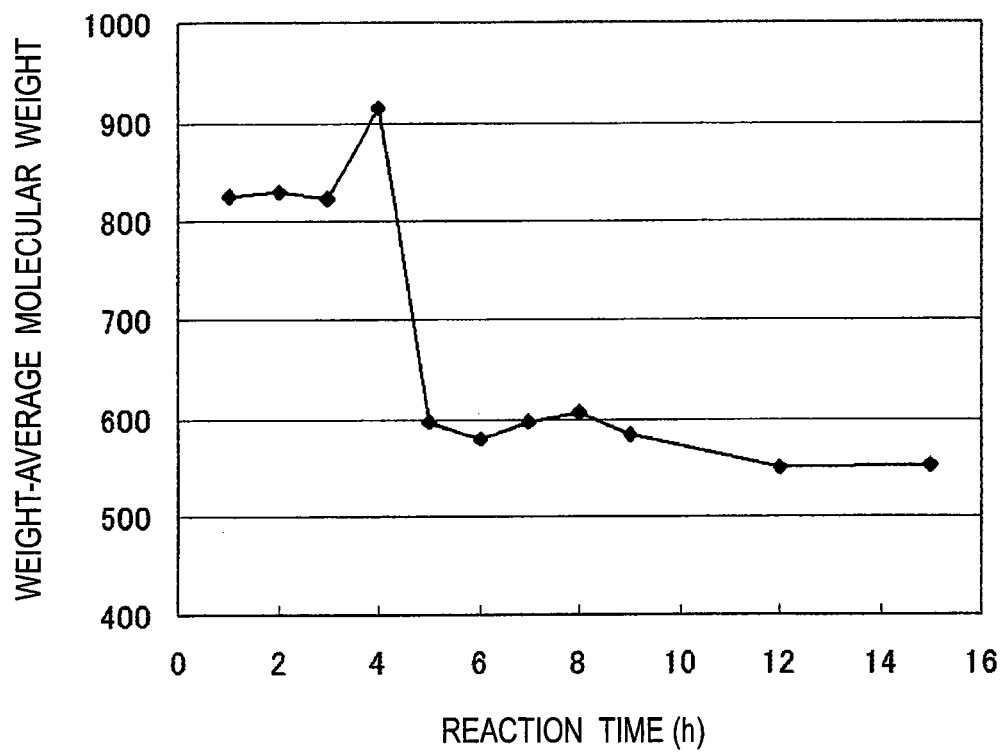
FIG. 1 is a graph showing a change in the weight-average molecular weight of the phenol resin in the reaction in Example 1.

The first phenol resin of the present invention has, as a unit in its main-chain skeleton, a structure represented by the following general formula (I):

[Formula 5]

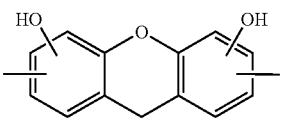

The second phenol resin of the present invention has, as a unit in its main-chain skeleton, a structure represented by the following general formula (II):

[Formula 6]

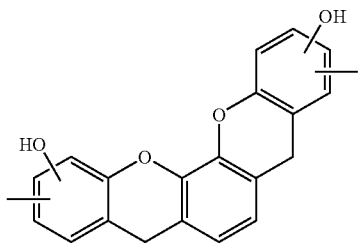

The third phenol resin of the present invention has, as a unit in its main-chain skeleton, a structure represented by the following general formula (III):

[Formula 7]

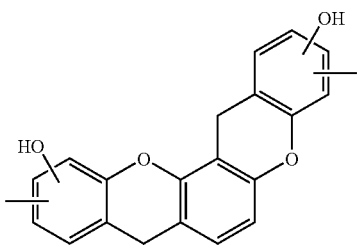

(III)

The fourth phenol resin of the present invention has, as a unit in its main-chain skeleton, a structure represented by the following general formula (IV):

[Formula 8]

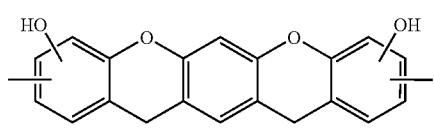

(IV)

The phenol resin of the present invention is a phenol resin which is obtained by the reaction between a dihydroxybenzene and an aldehyde, and preferably has a hydroxyl equivalent of 65 to 130 on average that is higher than the theoretical hydroxyl equivalent of a novolac resin of a dihydroxybenzene. Preferably the phenol resin of the present invention contains at least one of the first to fourth phenol resins. Preferably the phenol resin contains at least one kind of the structures represented by the general formulae (I), (II), (III) and (IV) in an amount of 5 to 50 mol %, more preferably 10 to 35 mol %.

Substituents other than hydroxyl groups may be introduced into the structures represented by the general formulae (I), (II), (III) and (IV). The substituents include, for example, an alkyl group, an alkenyl group, an aryl group and a halogen atom.

The phenol resin preferably has any of the structures represented by the general formulae (V), (VII), (VIII) and (IX):

[Formula 9]

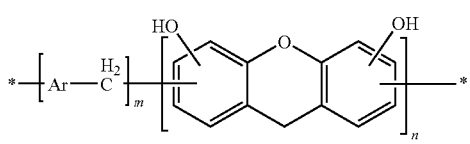

(V)

[Formula 10]

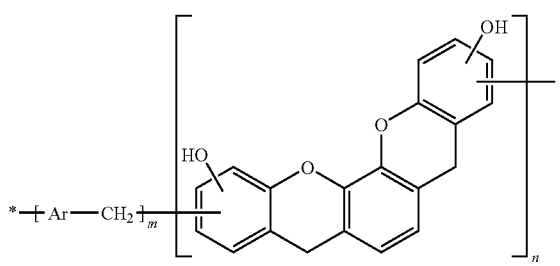

(VII)

[Formula 11]

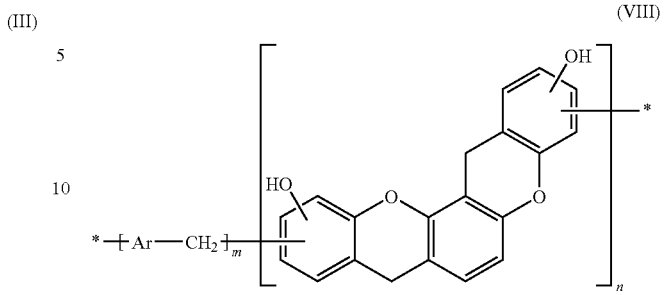

(VIII)

[Formula 12]

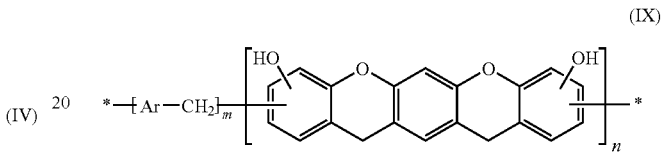

(IX)

In the general formulae (V), (VII), (VIII) and (IX), m and n each represent a positive number, and Ar represents at least one of organic groups represented by formulae (VIa) and (VIb) below. In the formulae (VIa) and (VIb) below, $R_1$ and $R_4$ are selected from a hydroxyl group and a hydrogen atom. $R_2$ and $R_3$ are independently selected from a hydrogen atom and an alkyl group having 1 to 8 carbon atoms, among which a hydrogen atom, a methyl group, an ethyl group, an isopropyl group and a tert-butyl group are preferable.

[Formula 13]

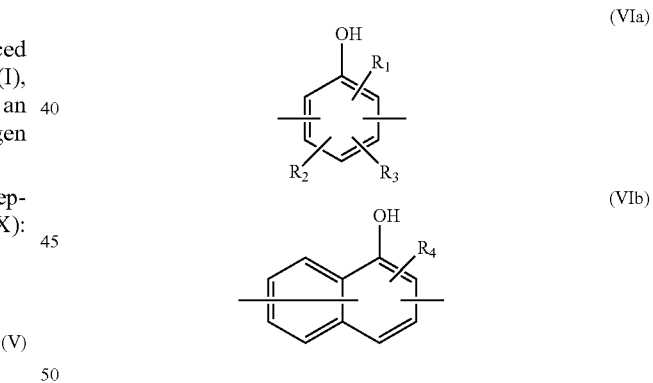

All Ar's in one molecule of the general formula (V), (VII), (VIII) or (IX) may the same atomic group or may contain two or more kinds of atomic groups.

The phenol resin of the present invention may contain copolymers wherein the "n" constituent units of any one of the above-mentioned (I) to (IV) and the "m" constituent units of any one of the above-mentioned (VIa) and (VIb) are contained in a main chain skeleton of the resin randomly, alternately, regularly or in block.

The method of obtaining the phenol resin of the present invention is not particularly limited insofar as the objective phenol resin can be obtained, but is preferably a method of using the intramolecular ring closure reaction, by autoxidation, of a starting material dihydroxybenzene for example among phenols, as shown below.

A phenol compound containing a dihydroxybenzene for example catechol or the like in an amount of 20 to 90 mol %, and an aldehyde, are subjected to contact catalytic reaction in the presence of an acid catalyst in the same manner as in producing general novolac resin. When formalin is used as the aldehyde, the starting materials are reacted under reflux at about 100° C. This reaction is carried out for 1 to 8 hours, and thereafter, the reaction solution is heated to 120 to 180° C. while the water in the system is removed. The atmosphere in this reaction shall be an oxidizing atmosphere (for example in an air stream). This state is continued for 2 to 24 hours, whereby a structure represented by the general formula (I) below is formed in the system. Thereafter, the desired phenol resin can be obtained by removing the unreacted monomers.

[Formula 14]

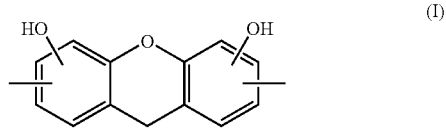

(I)

The dihydroxybenzene used in synthesis of the novel phenol resin of the present invention includes monocyclic dihydroxyarenes such as catechol, resorcin and hydroquinone, and polycyclic dihydroxyarenes for example dihydroxynaphthalenes such as 1,5-dihydroxynaphthalene, 1,6-dihydroxynaphthalene and 1,4-dihydroxynaphthalene, and a combination of these compounds may also be used.

The dihydroxybenzene may be used in combination with monohydroxyarenes. Among the monohydroxyarene, monocyclic hydroxyarenes include phenol, alkyl phenols such as o-cresol, p-cresol, m-cresol, butyl phenol, xylenol, nonyl phenol and octyl phenol, phenyl phenol, bisphenol A, bisphenol F, bisphenol S, amyl phenol, pyrogallol, allyl phenol, bisphenol fluorene etc., and polycyclic monohydroxyarenes include phenol compounds used in synthesis of usual phenol resin, for example, 1-naphthol and 2-naphthol, and these compounds may be used singly or as a mixture of two or more thereof.

The aldehyde includes aldehydes used in synthesis of phenol resin, for example, formaldehyde, acetaldehyde, benzaldehyde and salicyl aldehyde, and these compounds may be used singly or as a mixture of two or more thereof.

In the presence of an acid catalyst, the phenol is reacted with the aldehyde in an amount of preferably 0.3 to 0.9 mole, more preferably 0.4 to 0.8 mole, per mole of the phenol. When the amount of the aldehyde is less than 0.3 mole, a novolac resin is formed, but the content of a xanthene derivative therein is low and the unreacted phenol is increased so that the amount of the resin formed tends to be decreased. When the amount of the aldehyde is higher than 0.9 mole, the resin is formed advantageously in a higher amount, but gelation easily occurs in the reaction system so that regulation of the reaction tends to be very difficult.

An acid used as the catalyst includes organic carboxylic acids such as oxalic acid and acetic acid, strong acids such as hydrochloric acid, sulfuric acid, phosphoric acid, p-toluenesulfonic acid and trifluoroacetic acid, super-strong acids such as trifluoromethanesulfonic acid and methanesulfonic acid. These catalysts may be used alone or in combination of two or more thereof. The amount of the catalyst is preferably 0.0001 to 0.1 mole based on the phenol used. More preferably, the catalyst is used in an amount of 0.001 to 0.05 mole. When the amount of the catalyst is less than 0.0001 mole, the step of conducting intramolecular dehydration ring closure at 120 to 180° C. tends to take a longer time, while when the catalyst is used in an amount higher than 0.1 mole, a step of removing the catalyst tends to be troublesome in a system where ionic impurities are unfavorable for use in semiconductors etc.

The resin composition of the present invention contains the phenol resin, but may contain other compounds as necessary. In the case of an epoxy resin composition for example, other compounds include an epoxy resin, a hardening agent other than the phenol resin of the present invention, a hardening accelerator, and fillers. The composition may further contain various additives such as a coupling agent, an ion exchanger, a release agent, a stress relaxation agent, a flame retardant and a coloring agent.

The epoxy resin is not particularly limited, and any epoxy resin having two or more epoxy groups in one molecule can be used. Examples of the epoxy resin include epoxylated novolac resins such as a phenol novolac-type epoxy resin, an o-cresol novolac-type epoxy resin and an epoxy resin having a triphenylmethane skeleton, diglycidyl ethers of bisphenol A, bisphenol F, bisphenol S and alkyl-substituted or unsubstituted bisphenol, a stilbene-type epoxy resin, a hydroquinone-type epoxy resin, a glycidyl ester-type epoxy resin, a glycidyl amine-type epoxy resin, an epoxylated dicyclopentadiene/phenol co-condensed resin, an epoxy resin having a naphthalene ring, epoxylated aralkyl-type phenol resins of a phenol-aralkyl resin, a naphthol-aralkyl resin and a biphenylene-aralkyl resin, a trimethylol propane-type epoxy resin, a terpene-modified epoxy resin, a linear aliphatic epoxy resin, an alicyclic epoxy resin, and a sulfur atom-containing epoxy resin, and these resins may be used alone or as a mixture of two or more thereof.

When an epoxy resin is used in the resin composition, the phenol resin acts as a hardening agent for the epoxy resin. In the resin composition of the present invention, the phenol resin of the present invention may be used alone or in combination with another hardening agent. The hardening agent used in addition to the phenol resin in the resin composition of the present invention is not particularly limited and may be any generally hardening agents used in materials such as resin forming materials for sealing, materials for lamination, and adhesives.

The equivalent ratio of the hardening agent to the epoxy resin, that is, the ratio of the number of hydroxyl groups in the hardening agent to the number of epoxy groups in the epoxy resin (the number of hydroxyl groups in the hardening agent/the number of epoxy groups in the epoxy resin), is not particularly limited, but is preferably established in the range of from 0.5 to 2, more preferably in the range of 0.6 to 1.3, in order to reduce their unreacted materials. The equivalent ratio is established still more preferably in the range of from 0.8 to 1.2.

Hereinafter, the present invention is described in more detail by reference to the Examples, but the scope of the present invention is not limited thereto.

Example 1

A 2-L separable flask equipped with a stirrer, a condenser and a thermometer was charged with 220 g of catechol, 81.1 g of 37% formalin, 2.5 g of oxalic acid and 100 g of water, and the mixture was heated on an oil bath to 100° C. The reaction was continued for 3 hours at about 104° C. under reflux.

Figure 2:
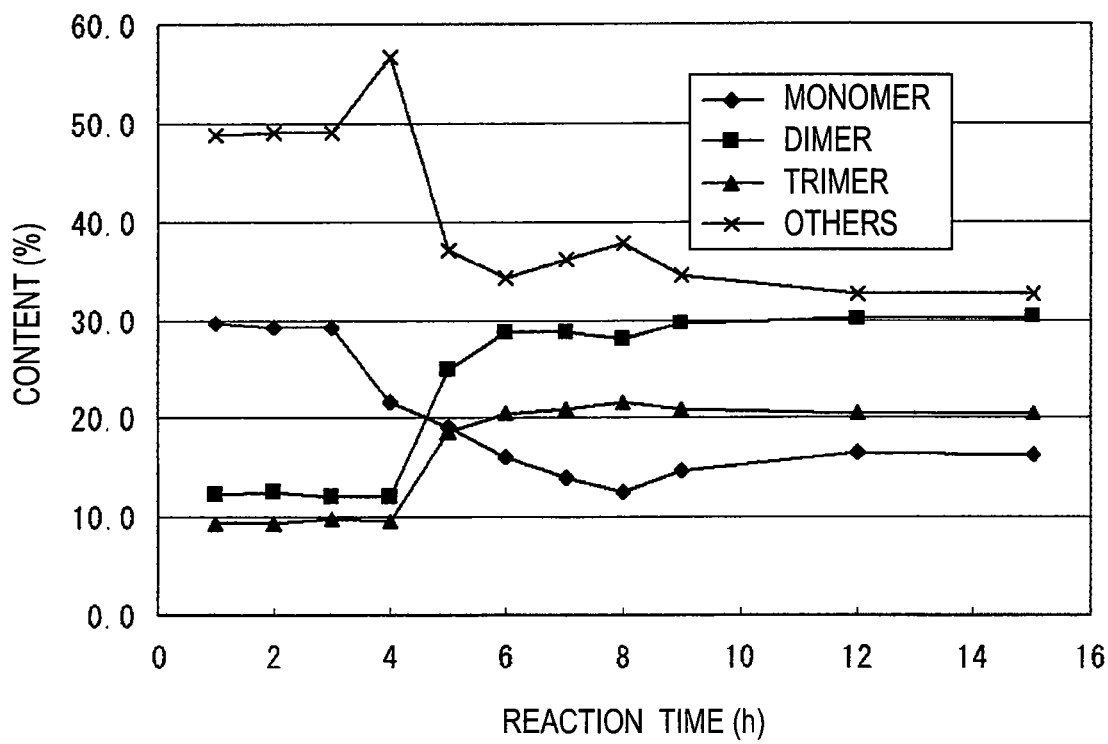
FIG. 2 is a graph showing a change in the number of nuclei (content) of the molecule of the phenol resin in Example 1.

Thereafter, the temperature in the flask was increased to 150° C. while water was distilled away. The reaction was continued for 12 hours at a temperature kept at 150° C. Thereafter, the reaction solution was concentrated for 20 minutes under reduced pressure to remove the water etc. in the system, thereby recovering the resulting phenol resin. The resulting resin had a number-average molecular weight of 400 and a weight-average molecular weight of 550. The hydroxyl equivalent of the resin was confirmed to be 112 by titration as described later. The change in the weight-average molecular weight during synthesis is shown in FIG. 1, and the change in the contents (number of nuclei in the molecule) of a monomer, a dimer, a trimer, and others (tetramer or more) during synthesis is shown in FIG. 2. A GPC chart of the resulting phenol resin is shown in FIG. 3.

Figure 3:
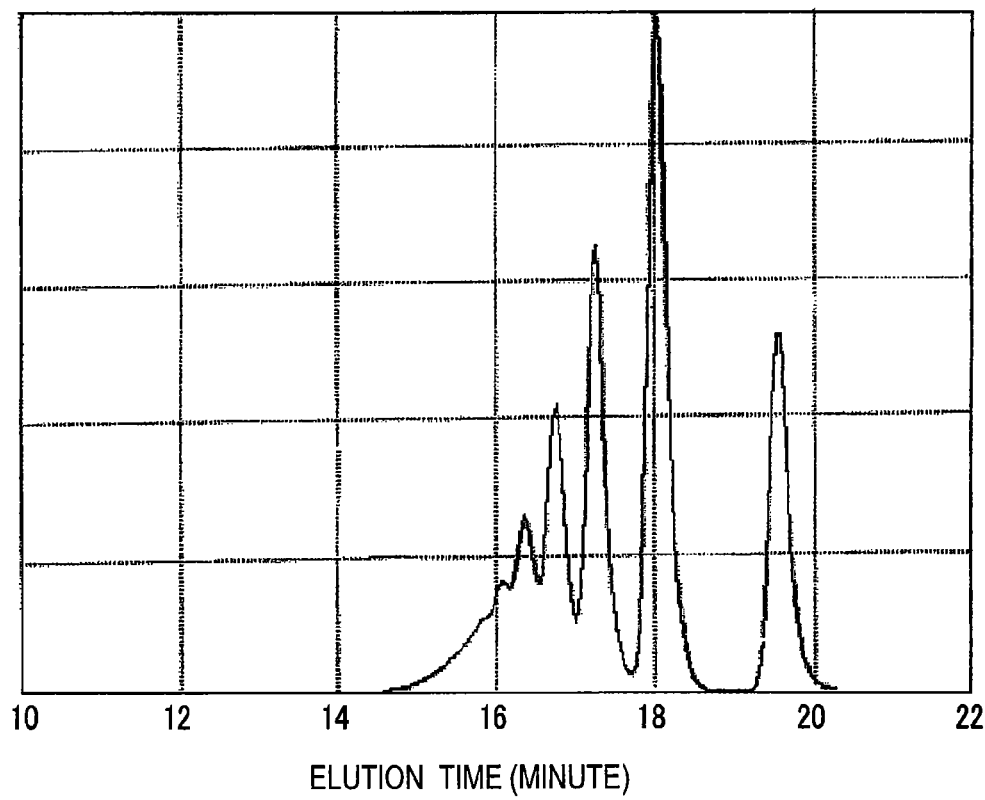
FIG. 3 is a GPC chart of the phenol resin obtained in Example 1.

The change in the content in FIG. 2 was determined from a chart such as in FIG. 3, which was obtained by gel filtration of products removed at predetermined intervals, and the content was determined from the area of a peak in the GPC chart in FIG. 3 wherein a monomer was assigned to the last peak, a dimer to a first peak counting from the last peak, a trimer to a second peak from the last peak, and a tetramer and more to a third peak and subsequent peaks from the last peak. Therefore, a sample referred to as a dimer, trimer or the like is not necessarily meant to be the same component, and each peak is considered as a phenol resin mixture.

The phenol resin obtained in each of the Examples in the present invention was measured in the following manner. The number-average molecular weight (Mn) and weight-average molecular weight (Mw) were determined using a high performance liquid chromatographic unit L6000 manufactured by Hitachi and a data analysis unit C-R4A manufactured by Shimadzu Corporation. GPC columns used in this analysis were G2000HXL and G3000HXL manufactured by Tosoh Corporation. The sample was measured at a concentration of 0.2% with tetrahydrofuran as the mobile phase at a flow rate of 1.0 ml/min. Standard polystyrene samples were used to prepare a standard curve which was then used in calculation of polystyrene-equivalent molecular weights such as number-average molecular weight.

The hydroxyl equivalent was measured by an acetyl chloride-potassium hydroxide titration method. Because the solution was dark, the titration end-point was determined not by a coloration method with an indicator but by potentiometric titration. Specifically, hydroxyl groups in the resin to be measured were converted into acetyl chloride in a pyridine solution, then an excess of the reagent was decomposed with water, and the formed acetic acid was titrated with a solution of potassium hydroxide in methanol.

As the reaction proceeds, the molecular weight is decreased as shown in FIG. 1, a stable dimer and trimer are formed as shown in FIG. 2, the hydroxyl equivalent is higher than the theoretical value (around 60), and catechol was used; for these reasons, it is estimated that phenol resins having the structures of the formulae (I) and (II) have been obtained. The compound having the structure of the formula (I) is formed, and by further dehydration reaction, the compound having the structure of the formula (II) is obtained.

Example 2

Figure 4:
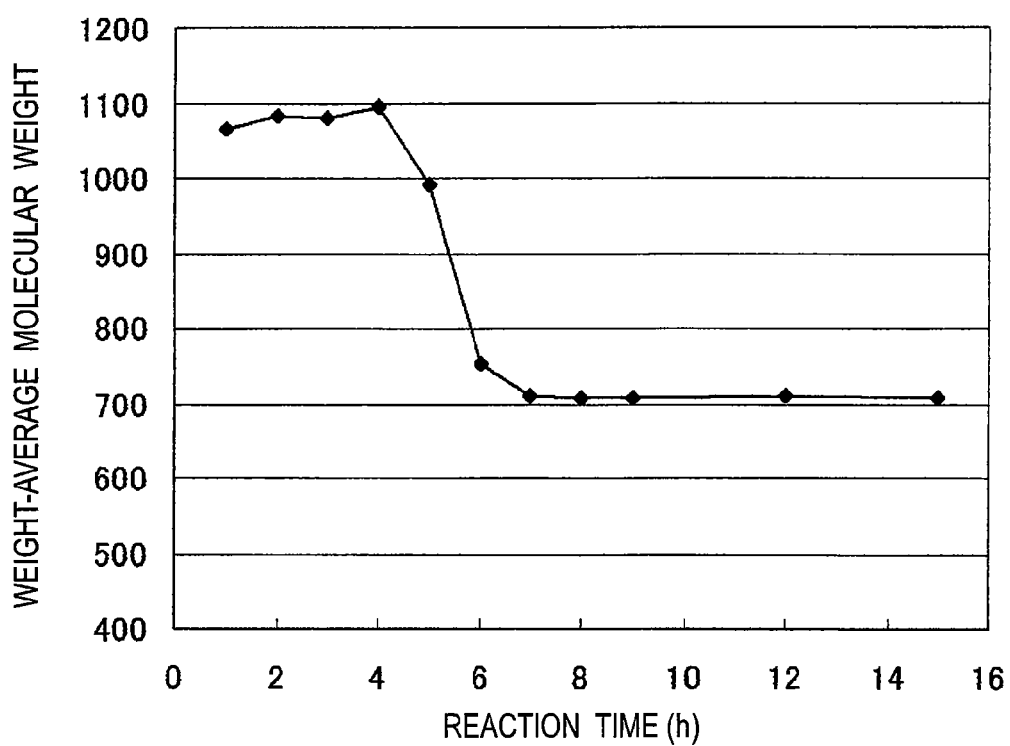
FIG. 4 is a graph showing a change in the weight-average molecular weight of the phenol resin in the reaction in Example 2.
Figure 5:
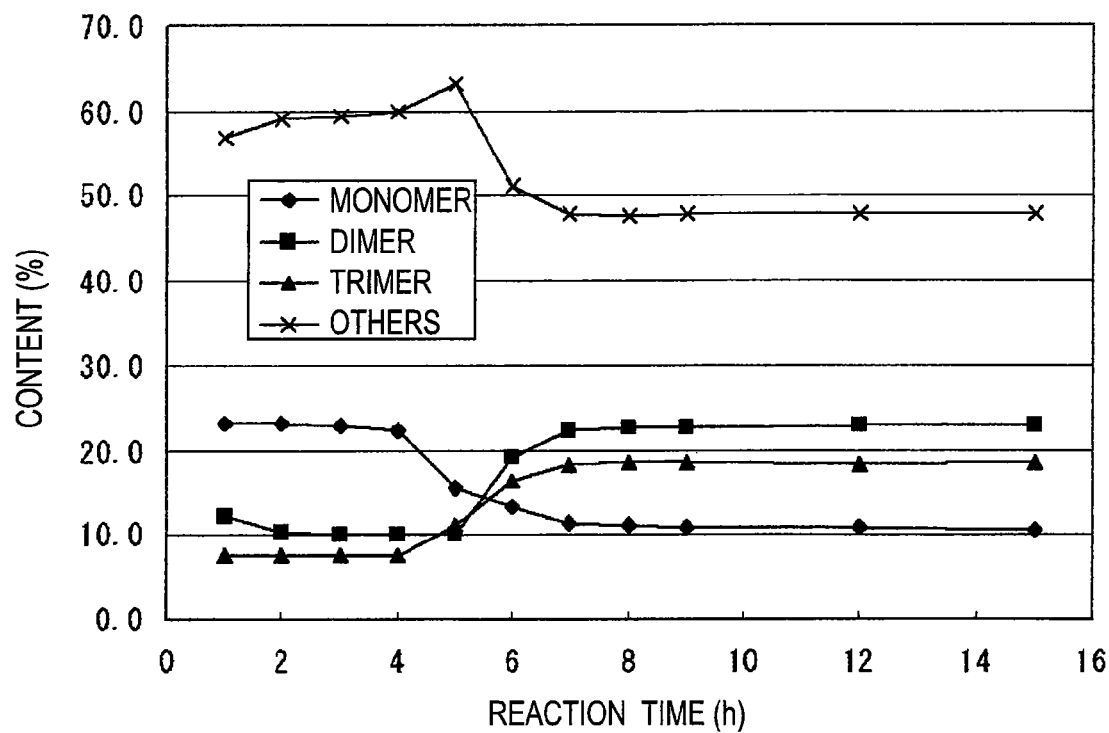
FIG. 5 is a graph showing a change in the number of nuclei (content) of the molecule of the phenol resin in Example 2.
Figure 6:
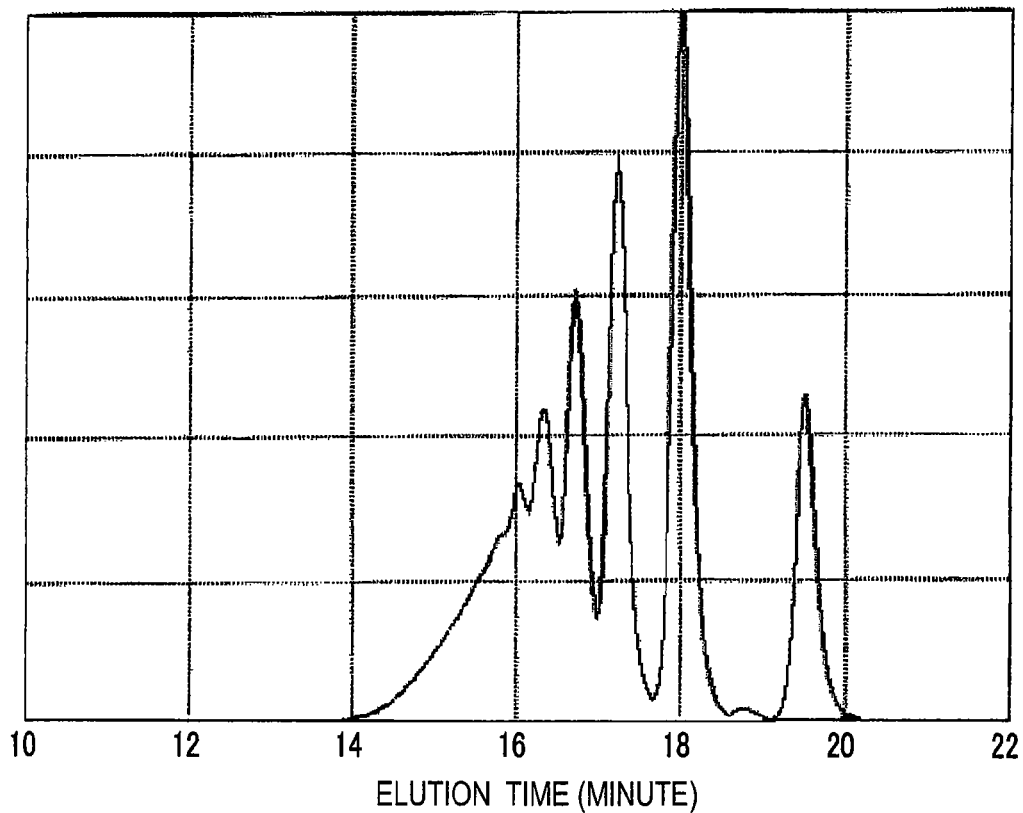
FIG. 6 is a GPC chart of the phenol resin obtained in Example 2.

A 2-L separable flask equipped with a stirrer, a condenser and a thermometer was charged with 220 g of catechol, 97.3 g of 37% formalin, 5 g of oxalic acid and 200 g of water, and the mixture was heated on an oil bath to 100° C. The mixture was refluxed at about 104° C., and the reaction was continued at the reflux temperature for 3 hours. Thereafter, the temperature in the flask was increased to 140° C. while water was distilled away. The reaction was continued for 12 hours at a temperature kept at 140° C. Thereafter, the reaction solution was heated to 160° C. and concentrated for 20 minutes under reduced pressure to remove the water etc. in the system, thereby recovering the resulting phenol resin. The resulting resin had a number-average molecular weight of 500 and a weight-average molecular weight of 700. The hydroxyl equivalent of the resin was 118. The change in the weight-average molecular weight during synthesis is shown in FIG. 4, and the change in the contents of a monomer, a dimer, a trimer and a tetramer and more during synthesis is shown in FIG. 5. A GPC chart of the resulting phenol resin is shown in FIG. 6.

For the same reasons as in Example 1, it is estimated that phenol resins having the structures of the formulae (I) and (II) have been obtained.

Example 3

Figure 7:
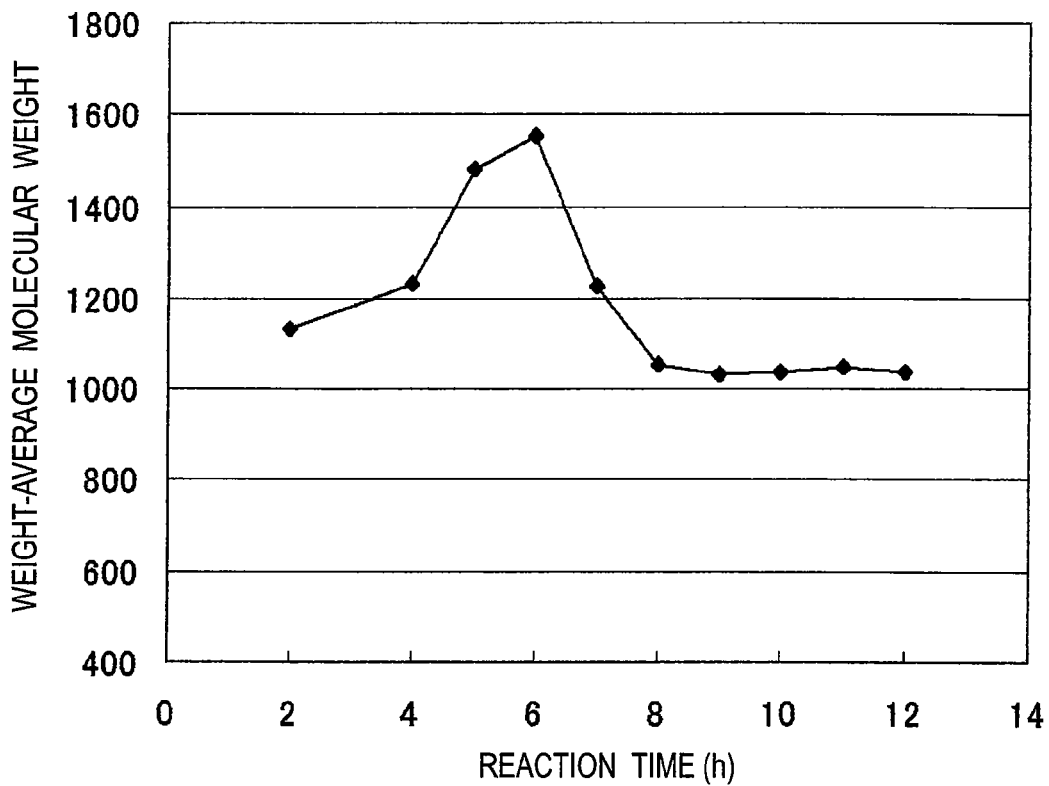
FIG. 7 is a graph showing a change in the weight-average molecular weight of the phenol resin in the reaction in Example 3.
Figure 8:
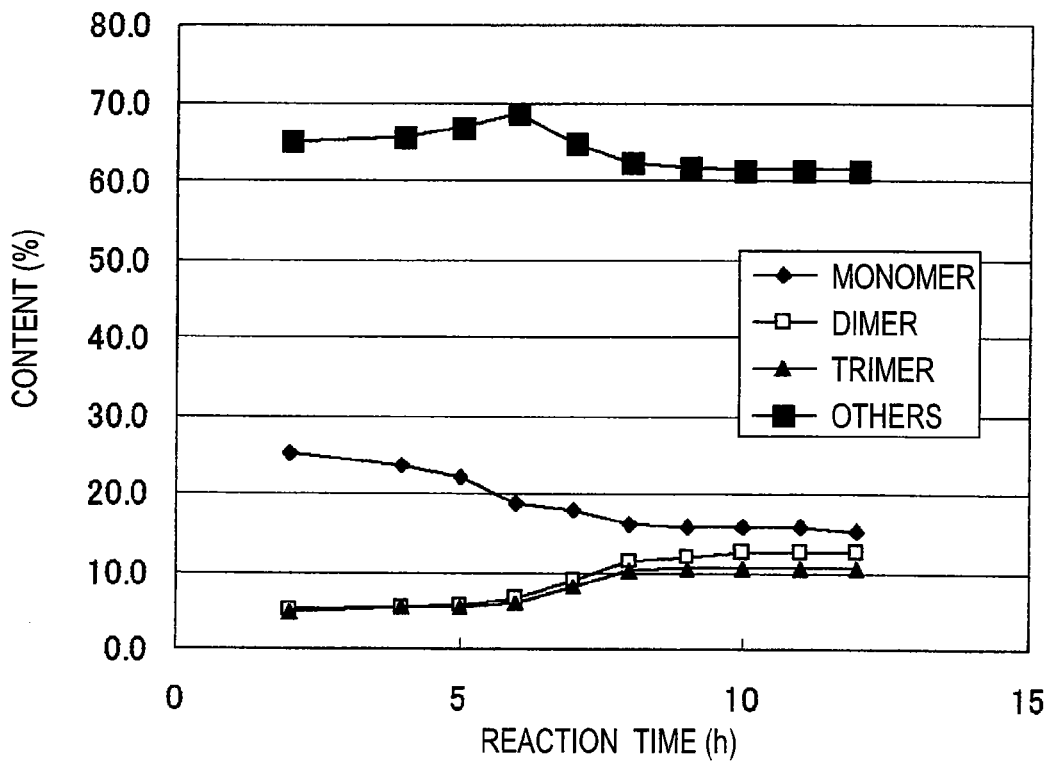
FIG. 8 is a graph showing a change in the number of nuclei (content) of the molecule of the phenol resin in Example 3.
Figure 9:
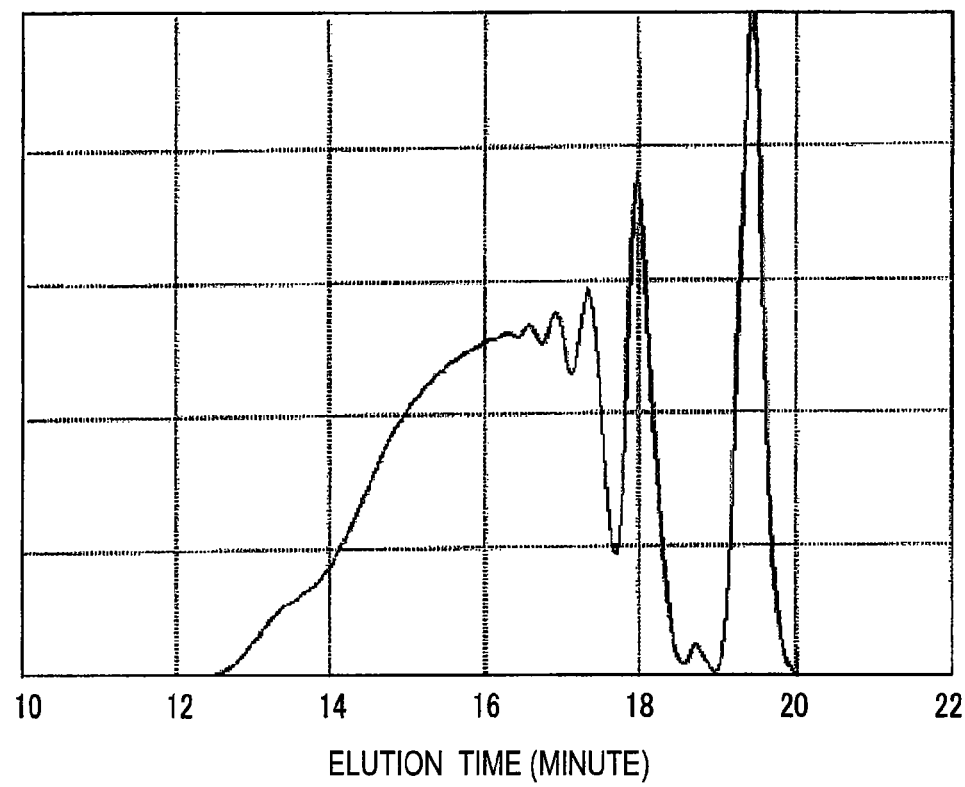
FIG. 9 is a GPC chart of the phenol resin obtained in Example 3.

A 3-L separable flask equipped with a stirrer, a condenser and a thermometer was charged with 462 g of resorcinol, 198 g of catechol, 316.2 g of 37% formalin, 15 g of oxalic acid and 300 g of water, and the mixture was heated on an oil bath to 100° C. The mixture was refluxed at about 104° C., and the reaction was continued for 4 hours at the reflux temperature. Thereafter, the temperature in the flask was increased to 170° C. while water was distilled away. The reaction was continued for 8 hours at a temperature kept at 170° C. Thereafter, the reaction solution was concentrated for 20 minutes under reduced pressure to remove the water etc. in the system, thereby recovering the resulting phenol resin. The resulting resin had a number-average molecular weight of 540 and a weight-average molecular weight of 1000. The hydroxyl equivalent of the resin was 108. The change in the weight-average molecular weight during synthesis is shown in FIG. 7, and the change in the contents of a monomer, a dimer, a trimer, and a tetramer and more during synthesis is shown in FIG. 8. A GPC chart of the resulting phenol resin is shown in FIG. 9.

For the reason that catechol and resorcinol are used, it is estimated that phenol resins having the structures of the formulae (I) to (IV) have been obtained.

Example 4

Figure 10:
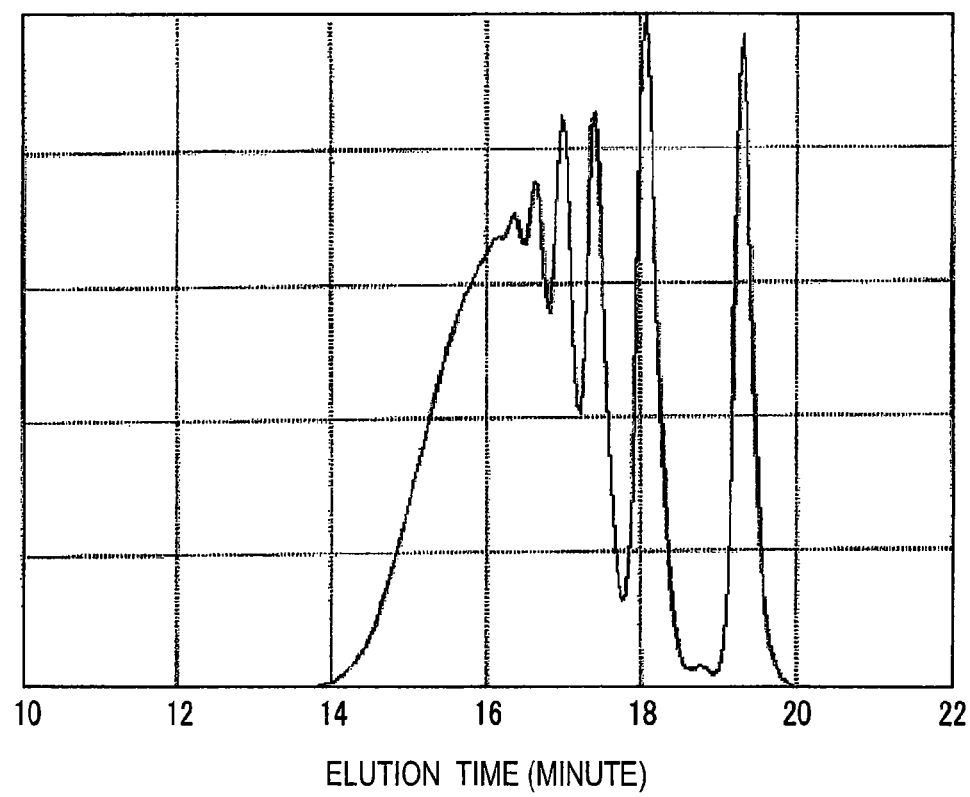
FIG. 10 is a GPC chart of the phenol resin obtained in Example 4.

A 3-L separable flask equipped with a stirrer, a condenser and a thermometer was charged with 660 g of resorcinol, 316.2 g of 37% formalin, 15 g of oxalic acid and 300 g of water, and the mixture was heated on an oil bath to 100° C. The mixture was refluxed at about 102° C., and the reaction was continued for 4 hours at the reflux temperature. Thereafter, the temperature in the flask was increased to 160° C. while water was distilled away. The reaction was continued for 6 hours at a temperature kept at 160° C. Thereafter, the reaction solution was concentrated for 20 minutes under reduced pressure to remove the water etc. in the system, thereby recovering the resulting phenol resin. The resulting resin had a number-average molecular weight of 530 and a weight-average molecular weight of 780. The hydroxyl equivalent of the resin was 88. A GPC chart of the resulting phenol resin is shown in FIG. 10.

For the reason that only resorcinol was used, it is estimated that the compound of the formula (II) is not obtained, and phenol resins having the structures of the formulae (I), (III) and (IV) have been obtained.

Example 5

Figure 11:
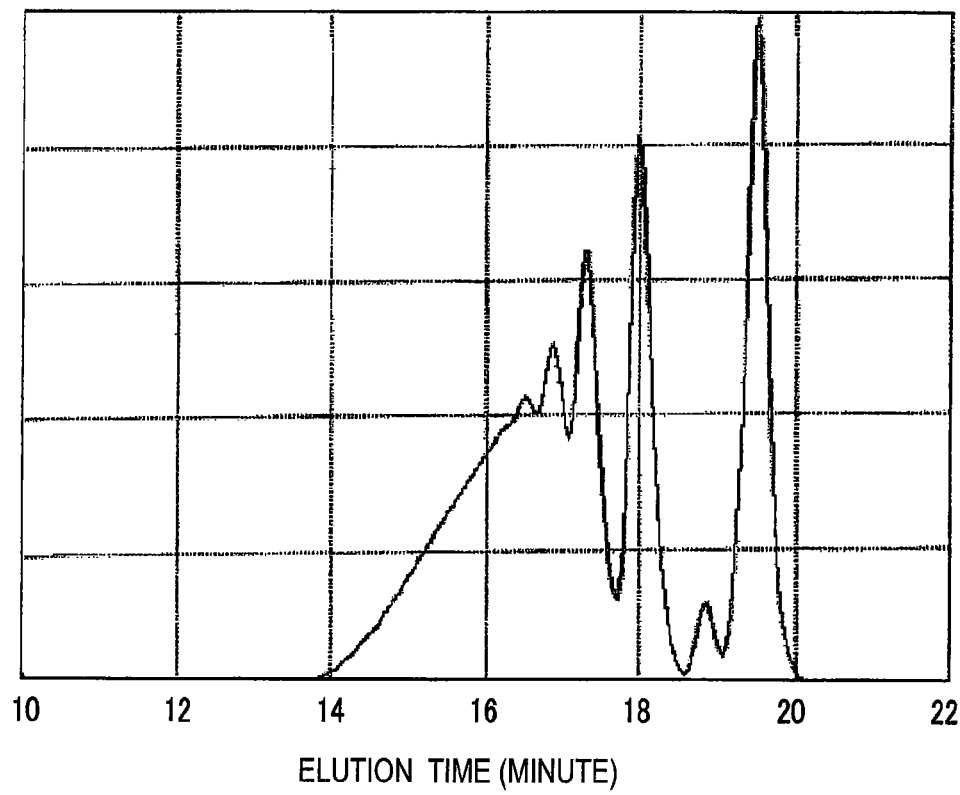
FIG. 11 is a GPC chart of the phenol resin obtained in Example 5.

A 3-L separable flask equipped with a stirrer, a condenser and a thermometer was charged with 330 g of resorcinol, 330 g of catechol, 267.6 g of 37% formalin, 2 g of 1 N hydrochloric acid and 300 g of water, and the mixture was heated on an oil bath to 100° C. The reaction was continued for 3 hours at the reflux temperature. Thereafter, the temperature in the flask was increased to 150° C. while water was distilled away. The reaction was continued for 4 hours at a temperature kept at 150° C. Thereafter, the reaction solution was concentrated for 20 minutes under reduced pressure to remove the water etc. in the system, thereby recovering the resulting phenol resin. The resulting resin had a number-average molecular weight of 430 and a weight-average molecular weight of 680. The hydroxyl equivalent of the resin was 138. A GPC chart of the resulting phenol resin is shown in FIG. 11.

For the same reasons as in Example 3, it is estimated that phenol resins having the structures of the formulae (I) to (IV) have been obtained.

Example 6

Figure 12:
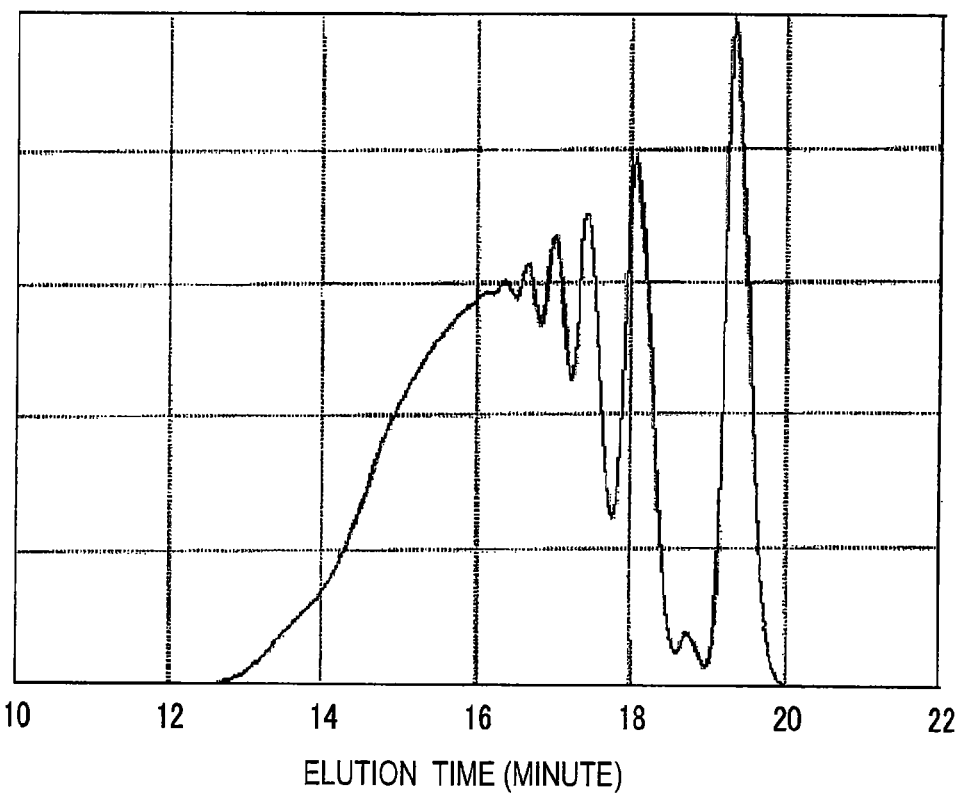
FIG. 12 is a GPC chart of the phenol resin obtained in Example 6.

A 3-L separable flask equipped with a stirrer, a condenser and a thermometer was charged with 594 g of resorcinol, 66 g of catechol, 316.2 g of 37% formalin, 15 g of oxalic acid and 100 g of water, and the mixture was heated on an oil bath to 100° C. The reaction was continued for 4 hours at the reflux temperature. Thereafter, the temperature in the flask was increased to 170° C. while water was distilled away. The reaction was continued for 8 hours at a temperature kept at 170° C. Thereafter, the reaction solution was concentrated for 20 minutes under reduced pressure to remove the water etc. in the system, thereby recovering the resulting phenol resin. The resulting resin had a number-average molecular weight of 530 and a weight-average molecular weight of 930. The hydroxyl equivalent of the resin was 95. A GPC chart of the resulting phenol resin is shown in FIG. 12.

For the same reasons as in Example 3, it is estimated that phenol resins having the structures of the formulae (I) to (IV) have been obtained.

Example 7

A 2-L separable flask equipped with a stirrer, a condenser and a thermometer was charged with 396 g of hydroquinone, 264 g of catechol, 243 g of 37% formalin, 5 g of oxalic acid and 300 g of water, and the mixture was heated on an oil bath to 100° C. The mixture was refluxed at about 102° C., and the reaction was continued for 3 hours at the reflux temperature. Thereafter, the temperature in the flask was increased to 160° C. while water was distilled away. The reaction was continued for 5 hours at a temperature kept at 160° C. Thereafter, the reaction solution was heated to 160° C. and concentrated for 10 minutes under reduced pressure to remove the water etc. in the system, thereby recovering the resulting resin. The resulting resin had a number-average molecular weight of 450 and a weight-average molecular weight of 900. The hydroxyl equivalent of the resin was 80.

It is estimated that phenol resins having the structures of the formulae (I) and (II) have been obtained.

As shown in the Examples, the hydroxyl equivalent of the phenol resin of the present invention is about 1.5- to 2.3-times as high as the theoretical hydroxyl equivalent (=60) of the catechol novolac resin, and this difference is attributable to a xanthene structure contained in the molecule. The reaction in conversion of a high-molecular-weight compound into a low-molecular-weight compound, accompanying dehydration ring closure, is also significant.

INDUSTRIAL APPLICABILITY

According to the phenol resin of the invention having a phenolic hydroxyl group in a main-chain structure of the phenol resin, epoxylation thereof by reaction with epichlorohydrin etc., chemical modification thereof, reaction thereof with an epoxy resin, and the like are facilitated. Phenol resins ranging from low-molecular-weight resins extremely rich in fluidity to high-melting resins can be synthesized, and these phenol resins are industrially useful.

When the phenol resin of the present invention is used as a hardening agent for epoxy resin etc., its resin composition can give a cured product of high Tg without deteriorating adhesiveness.

The invention claimed is:

1. A novolac phenol resin having, as a unit in a main-chain skeleton of the resin, a structure represented by the following general formula (I):

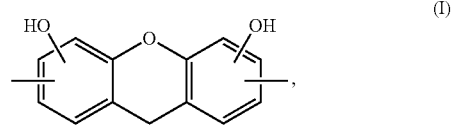

wherein the novolac phenol resin has a structure represented by general formulae (V),

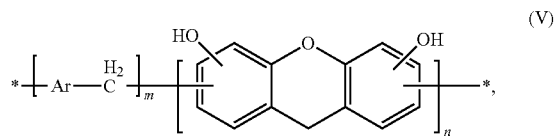

wherein m and n each represent a positive number, and Ar represents at least one of organic groups represented by formulae (VIa) and (VIb) below,

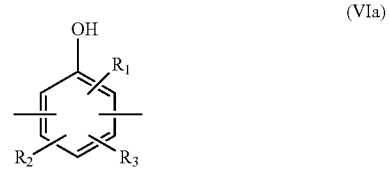

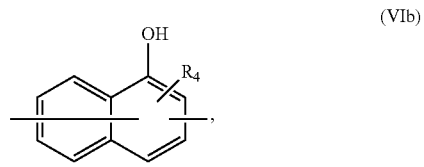

wherein $R_1$ and $R_4$ are selected from a hydroxyl group and a hydrogen atom, and $R_2$ and $R_3$ are independently selected from a hydrogen atom and an alkyl group having 1 to 8 carbon atoms, and wherein the novolac phenol resin has an average hydroxyl equivalent of 65 to 130.

2. A novolac phenol resin having, as a unit in a main-chain skeleton of the resin, a structure represented by the following general formula (II):

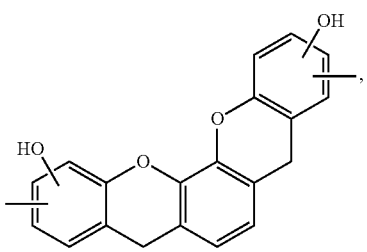

wherein the novolac phenol resin has a structure represented by general formulae (VII),

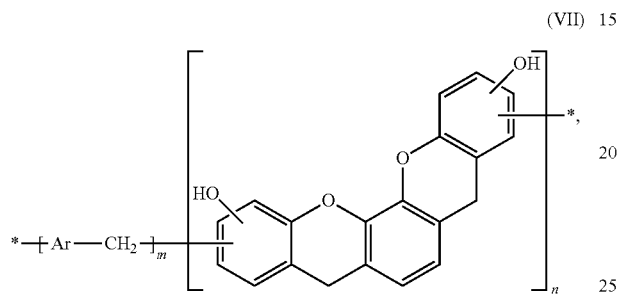

wherein m and n each represent a positive number, and Ar represents at least one of organic groups represented by formulae (VIa) and (VIb) below,

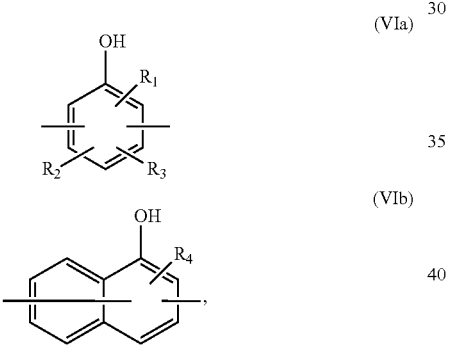

wherein $R_1$ and $R_4$ are selected from a hydroxyl group and a hydrogen atom, and $R_2$ and $R_3$ are independently selected from a hydrogen atom and an alkyl group having 1 to 8 carbon atoms, and wherein the novolac phenol resin has an average hydroxyl equivalent of 65 to 130.

3. A novolac phenol resin having, as a unit in a main-chain skeleton of the resin, a structure represented by the following general formula (III):

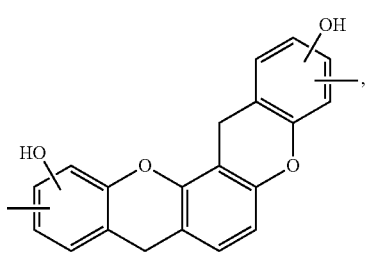

wherein the novolac phenol resin has a structure represented by general formulae (VIII),

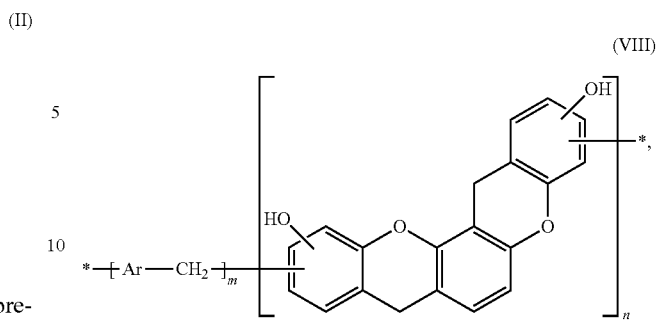

wherein m and n each represent a positive number, and Ar represents at least one of organic groups represented by formulae (VIa) and (VIb) below,

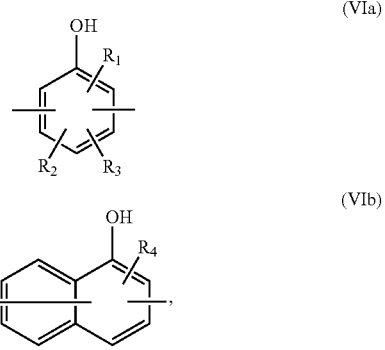

wherein $R_1$ and $R_4$ are selected from a hydroxyl group and a hydrogen atom, and $R_2$ and $R_3$ are independently selected from a hydrogen atom and an alkyl group having 1 to 8 carbon atoms, and wherein the novolac phenol resin has an average hydroxyl equivalent of 65 to 130.

4. A novolac phenol resin having, as a unit in a main-chain skeleton of the resin, a structure represented by the following general formula (IV):

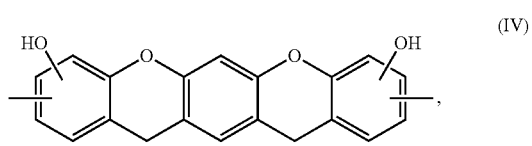

wherein the novolac phenol resin has a structure represented by general formulae (IX),

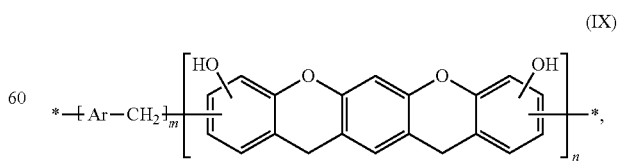

wherein m and n each represent a positive number, and Ar represents at least one of organic groups represented by formulae (VIa) and (VIb) below,

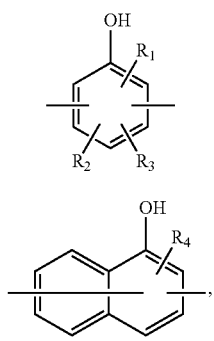

wherein $R_1$ and $R_4$ are selected from a hydroxyl group and a hydrogen atom, and $R_2$ and $R_3$ are independently selected from a hydrogen atom and an alkyl group having 1 to 8 carbon atoms, and wherein the novolac phenol resin has an average hydroxyl equivalent of 65 to 130.

5. A resin composition comprising the novolac phenol resin of claim 1.

6. A resin composition comprising the novolac phenol resin of claim 2.

7. A resin composition comprising the novolac phenol resin of claim 3.

8. A resin composition comprising the novolac phenol resin of claim 4.

9. A novolac phenol resin having, as a unit in a main-chain skeleton of the resin, a structure represented by the following general formula (I):

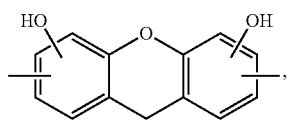

wherein the novolac phenol resin has a structure represented by general formulae (V),

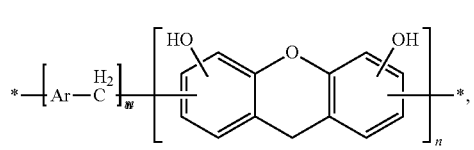

wherein m and n each represent a positive number, and Ar represents at least one of organic groups represented by formulae (VIa) and (VIb) below,

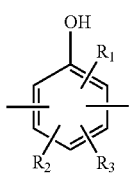

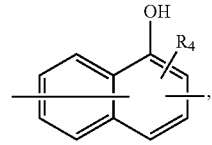

wherein $R_1$ and $R_4$ are selected from a hydroxyl group and a hydrogen atom, and $R_2$ and $R_3$ are independently selected from a hydrogen atom and an alkyl group having 1 to 8 carbon atoms, and wherein the novolac phenol resin is obtained by reaction between a dihydroxybenzene and an aldehyde, and has an average hydroxyl equivalent of 65 to 130.

10. A novolac phenol resin according to claim 1, wherein $R_1$, $R_2$, $R_3$ and $R_4$ are each a hydrogen atom.

11. A novolac phenol resin according to claim 2, wherein $R_1$, $R_2$, $R_3$ and $R_4$ are each a hydrogen atom.

12. A novolac phenol resin according to claim 3, wherein $R_1$, $R_2$, $R_3$ and $R_4$ are each a hydrogen atom.

13. A novolac phenol resin according to claim 4, wherein $R_1$, $R_2$, $R_3$ and $R_4$ are each a hydrogen atom.

14. A resin composition comprising the novolac phenol resin of claim 9.

15. A novolac phenol resin having, as a unit in a main-chain skeleton of the resin, a structure represented by the following general formula (II):

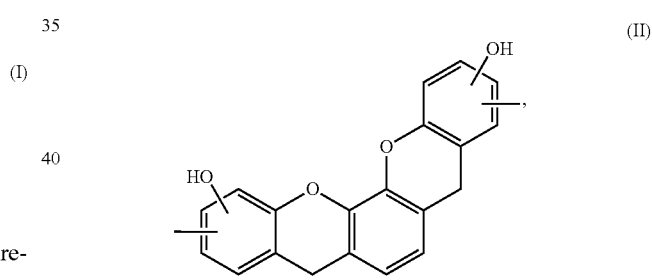

wherein the novolac phenol resin has a structure represented by general formulae (VII),

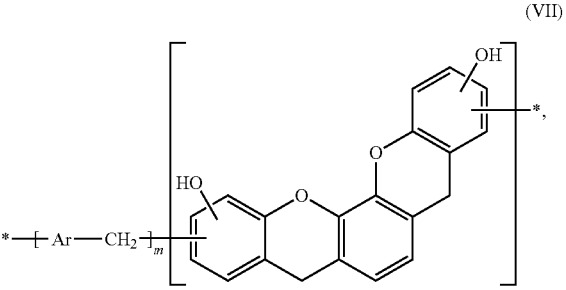

wherein m and n each represent a positive number, and Ar represents at least one of organic groups represented by formulae (VIa) and (VIb) below,

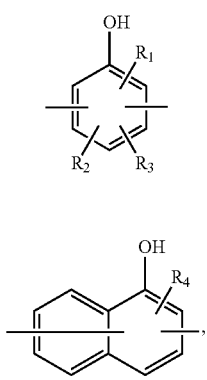

wherein $R_1$ and $R_4$ are selected from a hydroxyl group and a hydrogen atom, and $R_2$ and $R_3$ are independently selected from a hydrogen atom and an alkyl group having 1 to 8 carbon atoms, and wherein the novolac phenol resin is obtained by reaction between a dihydroxybenzene and an aldehyde, and has an average hydroxyl equivalent of 65 to 130.

16. A novolac phenol resin having, as a unit in a main-chain skeleton of the resin, a structure represented by the following general formula (III):

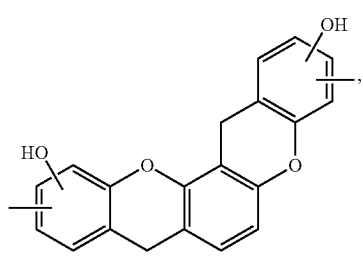

wherein the novolac phenol resin has a structure represented by general formulae (VIII),

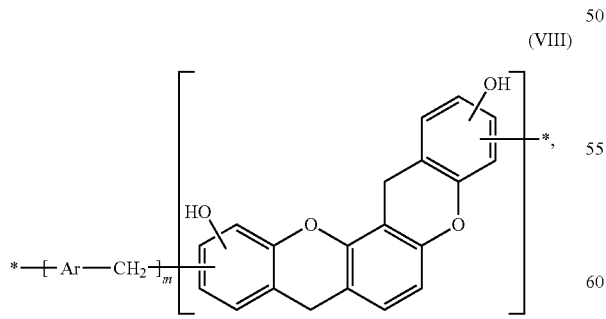

wherein m and n each represent a positive number, and Ar represents at least one of organic groups represented by formulae (VIa) and (VIb) below,

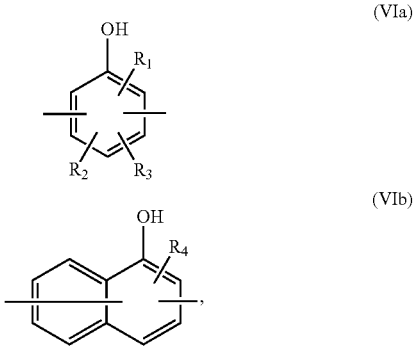

wherein $R_1$ and $R_4$ are selected from a hydroxyl group and a hydrogen atom, and $R_2$ and $R_3$ are independently selected from a hydrogen atom and an alkyl group having 1 to 8 carbon atoms, wherein the novolac phenol resin is obtained by reaction between a dihydroxybenzene and an aldehyde, and has an average hydroxyl equivalent of 65 to 130.

17. A novolac phenol resin having, as a unit in a main-chain skeleton of the resin, a structure represented by the following general formula (IV):

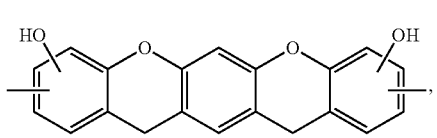

wherein the novolac phenol resin has a structure represented by general formulae (IX),

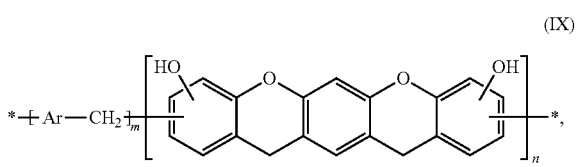

wherein m and n each represent a positive number, and Ar represents at least one of organic groups represented by formulae (VIa) and (VIb) below,

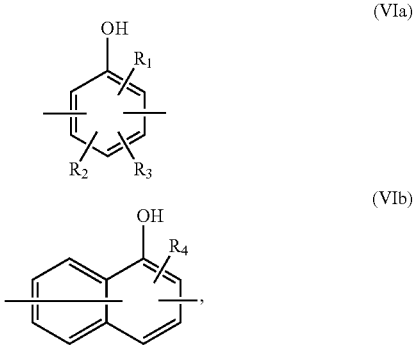

wherein $R_1$ and $R_4$ are selected from a hydroxyl group and a hydrogen atom, and $R_2$ and $R_3$ are independently selected from a hydrogen atom and an alkyl group having 1 to 8 carbon atoms, wherein the novolac phenol resin is obtained by reaction between a dihydroxybenzene and an aldehyde, and having an average hydroxyl equivalent of 65 to 130.

18. A resin composition comprising the novolac phenol resin of claim 15.

19. A resin composition comprising the novolac phenol resin of claim 16.

20. A resin composition comprising the novolac phenol resin of claim 17.

* * * * *